United States Patent [19]
Nitsch et al.

[11] Patent Number: 5,307,114
[45] Date of Patent: Apr. 26, 1994

[54] APPARATUS FOR MAKING PRINTS OF EXPOSED AND DEVELOPED PHOTOGRAPHIC FILMS

[75] Inventors: Wilhelm Nitsch, Munich; Erich Nagel, Anzing, both of Fed. Rep. of Germany

[73] Assignee: Agfa-Gevaert Aktiengesellschaft, Leverkusen, Fed. Rep. of Germany

[21] Appl. No.: 922,049

[22] Filed: Jul. 29, 1992

[30] Foreign Application Priority Data

Aug. 12, 1991 [DE] Fed. Rep. of Germany ....... 4126578

[51] Int. Cl.5 .................... G03B 29/00; G03B 27/60
[52] U.S. Cl. .......................................... 355/29; 355/73
[58] Field of Search ................. 355/54, 50, 51, 27–29, 355/77, 73

[56] References Cited

U.S. PATENT DOCUMENTS 3,674,367  7/1972  Chapman .............................. 355/77
4,576,469  3/1986  Shiga et al. ........................... 355/29

Primary Examiner—Richard A. Wintercorn
Attorney, Agent, or Firm—Darby & Darby

[57] ABSTRACT

Apparatus for making prints of exposed and developed film frames on discrete sheets of photographic paper and for developing the sheets has a copying station for successive exposed and developed film frames and a printing station where a discrete sheet of photographic paper receives an image of the frame at the copying station. A platform at the printing station carries a turntable which can change (when necessary) the orientation of a sheet, e.g., through 90°, to thus properly position a larger or smaller sheet for reception of the image. The turntable can receive sheets which are severed from different webs of unexposed photographic material, and each such web has a different width. The turntable can attract a sheet by suction during turning and/or during exposure. Such turntable can cooperate with one or more conveyors to maintain a sheet at the printing station in a predetermined plane during imaging of a film frame.

22 Claims, 3 Drawing Sheets

APPARATUS FOR MAKING PRINTS OF EXPOSED AND DEVELOPED PHOTOGRAPHIC FILMS

BACKGROUND OF THE INVENTION

The invention relates to improvements in apparatus for reproducing the images of exposed and developed films, and more particularly to improvements in apparatus for imaging portions of exposed and developed photographic films onto discrete sheets of photographic paper or other suitable photosensitive material.

An amateur photographer, as well as a professional photographer, often desires that prints of a series of freshly made exposures be completed as expeditiously as possible. Such services are rendered by certain establishments which specialize in so-called instant service. Thus, an exposed film which has been delivered to an establishment offering the so-called instant service is developed, its frames copied onto photographic paper, the paper developed, and individual prints made ready (with the exposed and developed film) within 60 minutes from the time of delivery. Establishments offering instant service or one-hour service can be found in all or nearly all larger cities but also in numerous smaller or medium sized cities or towns. As a rule, an establishment which specializes in instant service will operate with two units, namely a film developing machine and a so-called miniature laboratory wherein a copying machine is united with a developing machine for photographic paper. A miniature laboratory is often designed in such a way that it can accept and make copies of various types of exposed and developed photographic films.

Many photographers often desire that the exposed and developed film frames be imaged onto sheets of photographic paper having a particular size (e.g., 13×18 cm, 9×13 cm and/or others). Heretofore known proposals to meet such requirements include the utilization of several cassettes which contain webs of unexposed photographic paper. Each web has a different width. Thus, if the format of photographic prints is to be changed, an operator must remove a first cassette and replace it with a second cassette containing a web of photographic paper having a different width. Such repeated exchange of cassettes which contain webs of photographic paper having different widths is time consuming, and this is particularly undesirable in establishments which offer the aforediscussed instant service. Therefore, such establishments normally offer instant service only if the customer accepts prints of a single format. Accordingly, there exists an urgent need for equipment which can be utilized by establishments offering instant service and which is designed in such a way that prints of any one of a plurality of different formats can be made upon request and with no loss, or with little loss, in time.

OBJECTS OF THE INVENTION

An object of the invention is to provide a novel and improved apparatus which can rapidly develop exposed photographic films, rapidly transfer images from the frames of such films onto photographic paper or other suitable photosensitive material, and furnish prints of desired size and/or shape with little loss in time.

Another object of the invention is to provide an apparatus wherein the shift from the making of prints having a first format to the making of prints having a different second format can be completed within a short interval of time.

A further object of the invention is to provide improved equipment which can be utilized by establishments offering instant service for the development and copying of exposed photographic films.

An additional object of the invention is to provide an apparatus wherein the changeover to different formats of photographic prints can be carried out with a minimum of effort and wherein at least certain stages of the changeover can be automated to a desired extent.

Still another object of the invention is to provide the above outlined apparatus with novel and improved means for manipulating photosensitive material at the printing station where such material receives images of exposed and developed photographic films.

A further object of the invention is to provide the apparatus with novel and improved means for conveying sheets of photographic paper or other suitable photosensitive material to and from the printing station.

An additional object of the invention is to provide a novel and improved method of manipulating photosensitive material ahead of the printing station, at the printing station, and upon exposure to radiation at the printing station.

Another object of the invention is to provide a novel and improved combination of a film developing unit, a unit which transfers images of exposed and developed film frames onto sheets of photosensitive material, and a unit which develops the sheets of photosensitive material.

Still another object of the invention is to provide a novel and improved method of simplifying the operation of equipment which is used by establishments offering instant services involving the development of photographic films, transferring images of developed film frames onto photographic paper, and developing freshly exposed photographic paper.

SUMMARY OF THE INVENTION

The invention is embodied in an apparatus for making copies of photographic films on discrete sheets of photosensitive material (such as photographic paper). The improved apparatus comprises means for positioning films (e.g., discrete film frames or selected frames of a series of coherent film frames) at a copying station, means for locating discrete sheets of photosensitive material at a printing station which may but need not always be aligned with the copying station, means for imaging the film at the copying station onto a discrete sheet at the printing station, and means for changing the orientation of a sheet at the printing station. Such orientation changing means can form part of or can cooperate with the locating means and can include means (such as a turntable) for turning a sheet at the printing station or even prior to delivery of such sheet to the printing station.

In accordance with a presently preferred embodiment, the locating means can include a platform which defines a predetermined plane for a sheet at the printing station, and the turning means can be designed to change the orientation of a sheet at the printing station in or close to such predetermined plane.

The turning means can include means (e.g., suitably distributed suction ports) for attracting a sheet in or close to (i.e., at) the predetermined plane.

The locating means can further comprise at least one conveyor for sheets. For example, the locating means can comprise two conveyors for sheets and the turning means can be disposed between the conveyors. At least one of the conveyors can be provided with means (for example, suction ports) for attracting sheets thereto. The locating means then further comprises at least one suction generating device (e.g., one or more vacuum pumps and/or fans), and one or more valves and/or other suitable means for selectively connecting the at least one suction generating device with the ports. The arrangement can be such that the connecting means includes means (e.g., one or more first valves) for connecting the at least one suction generating device only with the ports of the at least one conveyor, only with the ports of the turning means or with all of the ports.

The orientation changing means can further comprise an elevator having means for raising the turning means and a discrete sheet thereon above the predetermined plane prior to turning of the sheet on the turning means, and for lowering the turning means and the sheet thereon into the predetermined plane subsequent to turning.

The apparatus preferably further comprises at least one source of a web of coherent sheets of photosensitive material, and means for subdividing the web into discrete sheets. It is often preferred to provide a plurality of sources each of which contains a web of coherent sheets, and such apparatus comprises discrete web cutting means for each source. The webs of different sources have different widths. The sources can include a first and a second source, and the locating means can be disposed between such first and second sources.

The imaging means can include one or more radiation sources which illuminate the film at the copying station and a varifocal lens (zoom lens) which images the film at the copying station onto the discrete sheet at the printing station.

In accordance with another presently preferred embodiment, the apparatus includes means for supplying discrete sheets to the turning means, and means for transporting the turning means between a first position for reception of a sheet from the supplying means and a second position at the printing station. Such transporting means can further comprise means for moving the turning means to a third position, and the apparatus then further comprises means for receiving sheets from the turning means when the latter assumes the third position; such receiving means can transport sheets to a developing machine for imprinted sheets of photosensitive material. The platform at the printing station can be provided with a recess (e.g., a straight elongated recess) for the turning means. The turning means occupies a portion of the recess and is movable therein between its various positions. The locating means then preferably further comprises a cover for the non-occupied portion of the recess. Such cover can include a band which is connected to and is movable with the turning means relative to the platform. The band and the turning means are provided with coplanar sheet supporting surfaces. The band can have a cutout or window for the turning means and two free ends which are coupled to each other by at least one coil spring or another suitable resilient coupling element.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
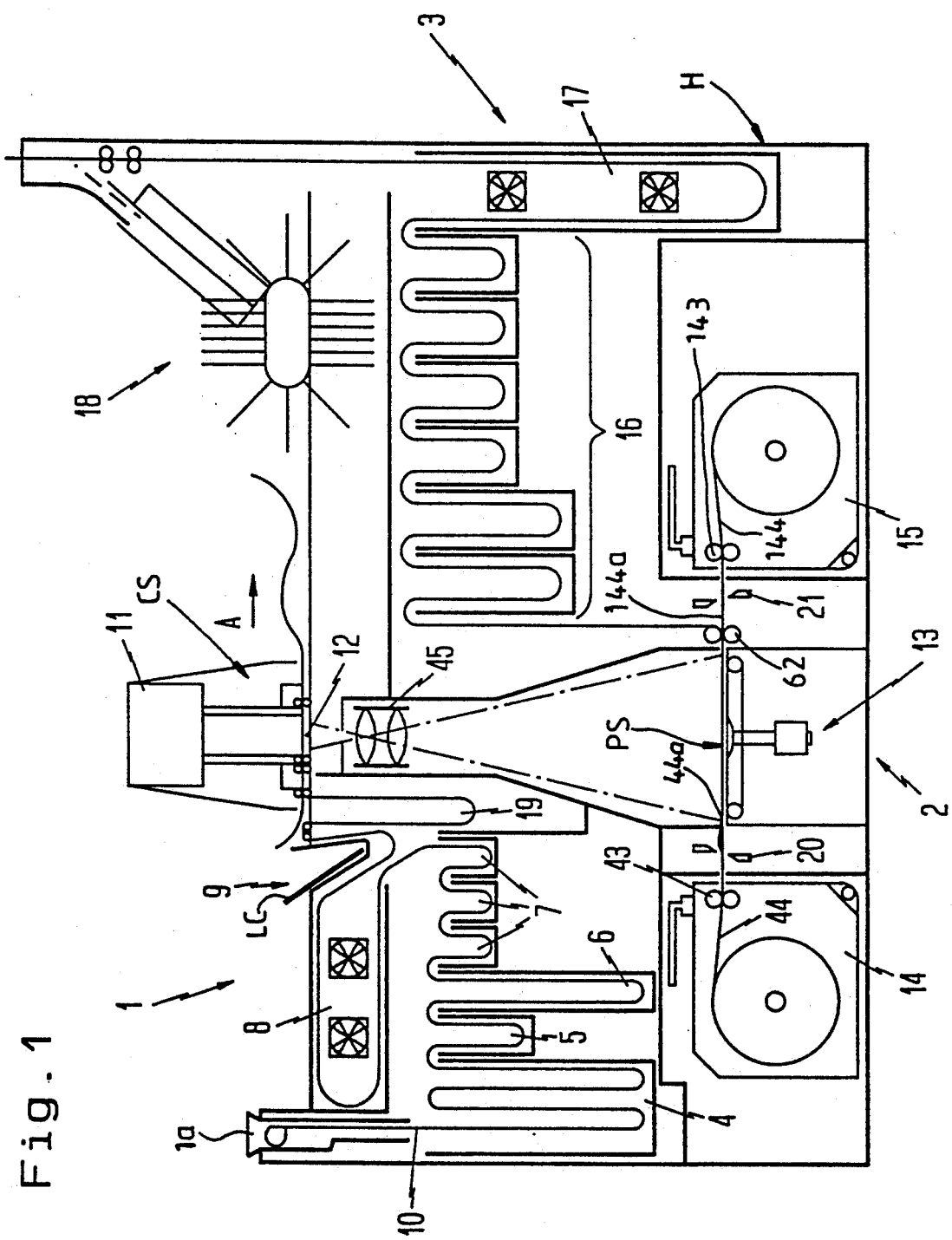
FIG. 1 is a schematic vertical sectional view of an apparatus which embodies one form of the invention and wherein the orientation changing means for discrete sheets of photosensitive material includes a turntable which is movable up and down at the printing station.

FIG. 1 shows an apparatus which embodies one form of the invention and constitutes a complete laboratory capable of performing all functions of treating and processing successive exposed photographic films 10. The apparatus comprises a film developing unit 1 having an inlet 1a for admission of successive exposed but undeveloped customer films 10, a copying unit 2 wherein successive frames of an exposed and freshly developed film 10 are imaged onto discrete sheets 44a or 144a of photosensitive material (such as photographic paper), and a developing machine or unit 3 wherein successive sheets 44a or 144a (each bearing the image of a film frame) are developed and thereupon admitted into a collating unit 18 at the outlet of the machine 3.

The film developing unit 1 contains a developing tank 4, a first rinsing tank 5, a fixing tank 6, a final rinsing tank 7 and a dryer 8. The character 9 denotes in FIG. 1 a device for automatic advancement of the leader of a freshly developed film 10 from the dryer 8 to a copying station CS of the unit 2. The latter accommodates means for imaging successive frames of a film 10 (or individual film frames) onto discrete sheets 44a or 144a. Such imaging means comprises one or more radiation sources 11 at a level above the copying station CS and a varifocal or zoom lens 45 at a level below such station. A platform 12 at the copying station CS constitutes or forms part of a means for positioning a film frame between the radiation source(s) 11 and the lens 45 in the course of a copying operation. The copying unit 2 further comprises means for locating a sheet 44a or 144a at a printing station PS during imaging of a film frame which is then located at the copying station CS. Such locating means includes a platform 13 which is located between two sources 14, 15 respectively containing convoluted webs 44 and 144 of unexposed photographic material. Each of the illustrated sources 14, 15 constitutes a cassette which can store a considerable length of photographic paper or other suitable photosensitive material, and each of these cassettes is removably installed in or on the housing H of the apparatus which is shown in FIG. 1.

The developing machine 3 for discrete sheets 44a or 144a contains a series of various baths 16 followed by a dryer 17 which precedes the collating unit 18. Sheets 44a or 144a which reach the unit 18 are fully developed photographic prints and are ready to be handed, shipped or otherwise returned to the customer, together with the corresponding exposed and developed film 10.

In order to complete an order, the leader of an exposed but undeveloped film 10 which has been hand delivered or otherwise supplied by a customer (be it an amateur photographer, a professional photographer, a dealer or another intermediary) must be provided with a so-called leader card LC which draws the film through the baths 4–7 and dryer 8 on to the device 9. The leader card LC can be affixed to a film 10 by hand or in a fully automatic way, all as is well known in the relevant art. The developing unit 1 contains a mechanism (not specifically shown) which advances the leader card LC through the baths 4, 5, 6, 7 and through the dryer 8 toward the device 9 where the card LC is separated from the leader of the freshly developed film 10 and the leader of the film is caused to advance toward and into the copying station CS.

An advantage of the leader card LC is that it can be used to draw a wider, a narrower, a shorter or a longer film 10 through the developing unit 1 with the same facility and with the same degree of reliability. The manner in which the card C can be separated from the leader of a freshly developed film 10 (e.g., by resorting to a cutter of the device 9) and in which the leader of the film can be advanced to the copying station CS without any assistance from an attendant) is described and shown in the commonly owned copending patent application Ser. No. 07/922,051 filed Jul. 29, 1992.

Since the rate of copying successive frames of a freshly developed film 10 at the copying station CS can depart from the rate of developing a film 10 in the unit 1, the apparatus of FIG. 1 preferably comprises a magazine 19 for temporary storage of a length of developed film 10 between the device 9 and the platform 12 of the positioning means in the copying unit 2. Successive frames of the film 10 are scanned by a monitoring device (not shown in FIG. 1) between the magazine 19 and the copying station CS while the film advances in the direction of arrow A. The thus obtained information is processed and is used for the imaging of film frames onto discrete sheets 44a or 144a at the printing station PS while the direction of advancement of the film 10 is reversed. A monitoring device which can be utilized to gather information pertaining to successive film frames prior to imaging of such frames onto photographic paper or other suitable photosensitive material is disclosed in commonly owned copending patent application Ser. No. 07/878,768 filed May 5, 1992 for "Method of and apparatus for ascertaining the characteristics of shorter and longer sections of photographic material".

The provision of two cassettes 14, 15 renders it possible to image successive or selected frames of a developed film 10, or individual film frames which are inserted into the copying station CS in a manner not forming part of the present invention (but described and shown in the aforementioned commonly owned copending patent application), with a minimum of delay and with minimal outlay for equipment. For example, the web 44 which is stored in the cassette 14 can have a width of 13 cm, and the web 144 which is stored in the cassette 15 can have a width in excess of or less than 13 cm. Discrete sheets 44a can be severed from the web 44 by a first cutting or subdividing device 20, and a discrete second cutting or subdividing device 21 is provided to sever the web 144 (when necessary) in order to form discrete sheets 144a. The means for supplying discrete sheets 44a from the cutting device 20 to the platform 13 at the printing station PS comprises at least one pair of driven advancing rolls 43, and the means for supplying discrete sheets 144a from the cutting device 21 to the platform 13 comprises at least one pair of driven advancing rolls 143. A sheet 44a or 144a which bears the image of a film frame is received by advancing rolls 62 which are disposed at the printing station PS and serve to convey such sheet into the first of the series of baths 16 in the developing machine 3 for sheets 44a or 144a. A sheet 44a or 144a which has advanced beyond the last bath in the machine 3 enters the dryer 17 and is then caused to enter the collating unit 18 in a condition ready for handing or shipment to the customer. The unit 18 is or can be provided with means for stacking prints which belong to a particular film 10.

The upper side or surface 22 (FIG. 2) of the platform 13 at the printing station PS is located in a predetermined plane at an optimum distance from a film frame on the positioning platform 12 at the copying station CS. A properly located discrete sheet 44a or 144a should be disposed at the plane of the surface 22. This surface is formed with recesses or grooves 23 and 24 for two endless foraminous belt conveyors 25 and 26 (see also FIG. 3). The underside or inner side of each of the two conveyors 25, 26 (which can be made of rubber or a flexible plastic material) is provided with several (e.g., three) endless channels 27 whose open sides are closed and sealed by the surfaces in the bottom portions of the respective grooves 23 and 24 so that each of these channels can convey air with no leakage or with a minimum of leakage. The surfaces in the bottom portions of the grooves 23, 24 are provided with slots 28 (FIG. 4) which establish communication between the channels 27 of the conveyor 25 and a suction duct 29, and between the channels of the conveyor 26 and a suction duct 30. The discharge ends of the ducts 29, 30 are connected to the respective inlets of a suction generating device 40 which is installed in or on the locating platform 13 and, when in operation, can draw air in directions indicated by arrows B, B and C shown in FIG. 2.

The conveyors 25, 26 are trained over a common idler pulley 31 which is installed in the platform 13, and over a common pulley 32 which can be driven clockwise as well as counterclockwise by a reversible motor 132.

In accordance with a feature of the invention, the apparatus further comprises means for changing the orientation of a sheet 44a or 144a at the plane of the surface 22 of the locating platform 13. The orientation changing means comprises a sheet turning means 34 (hereinafter called turntable for short) which can be actuated by remote control to manipulate a sheet 44a or 144a prior or subsequent to imaging of a film frame which is located at the copying station CS. The turntable 34 has suction ports 39 which attract a sheet 44a or 144a when the suction generating device 40 (e.g., a vacuum pump or a fan) is on and the path for the flow of air from the ports 39 to the corresponding inlet of the device 40 (arrow C in FIG. 2) is unobstructed. The conveyors 25 and 26 have rows of suction ports 33 which communicate with the respective channels 27 and enable the conveyors to attract the adjacent portions of a sheet 44a or 144a when the suction generating device 40 is on and the paths for the flow of air from the ports 33 to the respective inlets of the device 40 (arrows B in FIG. 2) are at least partially unobstructed.

Figure 2:
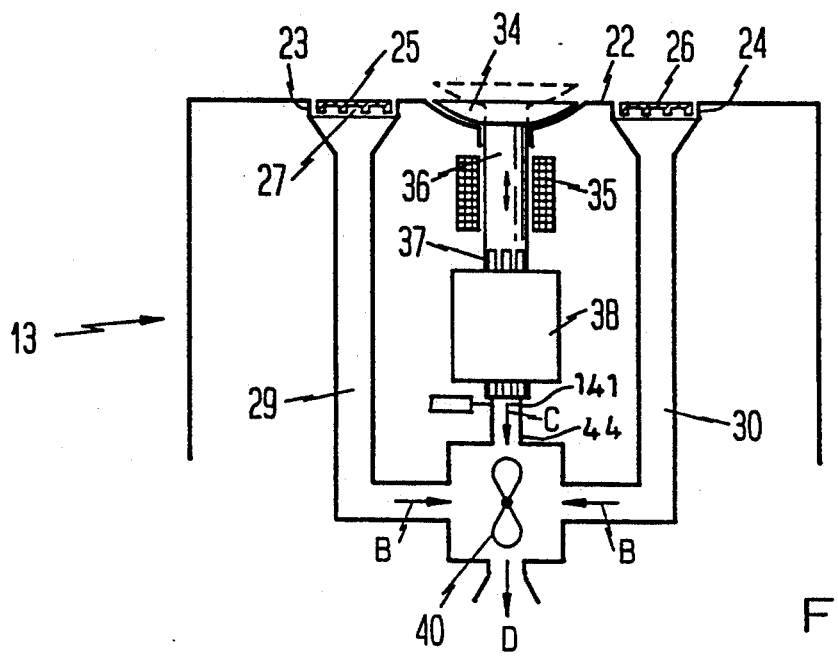
FIG. 2 is an enlarged vertical sectional view of the means for locating and changing the orientation of discrete sheets at the printing station in the apparatus of FIG. 1.
Figure 3:
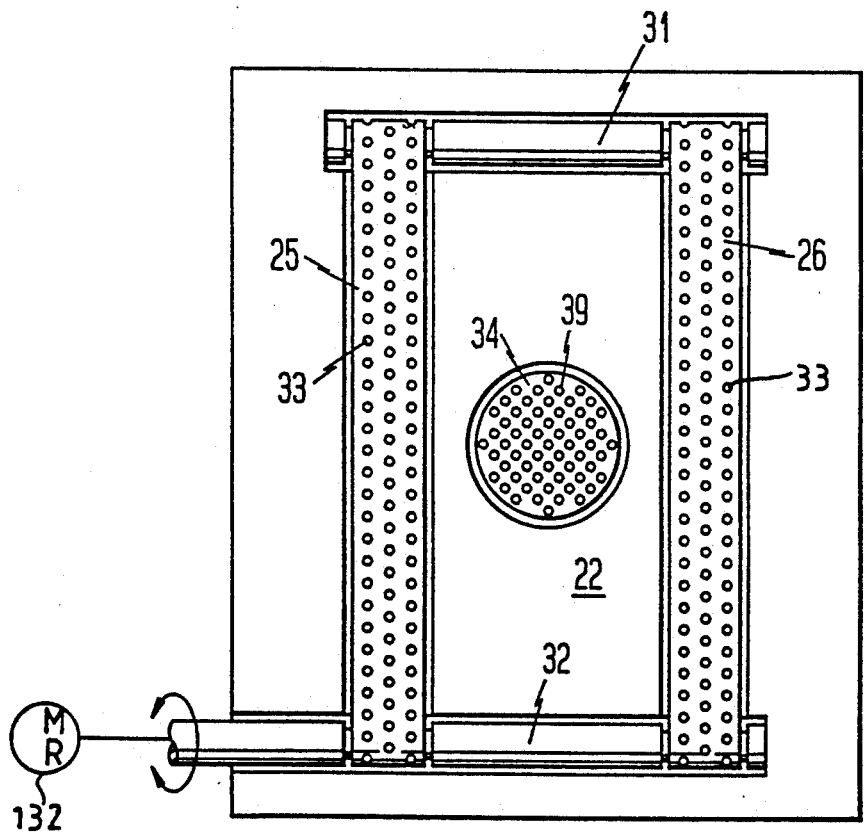
FIG. 3 is a plan view of the structure which is shown in FIG. 2.

The orientation changing means of the apparatus of FIGS. 1 to 4 further comprises an elevator for the turntable 34 and means for rotating the turntable about an axis which is normal to the plane of the surface 22. The elevator for the turntable 34 comprises an electromagnet 35 which surrounds a rotary and vertically reciprocable upright shaft 36 for the turntable 34. This shaft constitutes a means for raising or lowering the turntable 34 so that the upper side of the turntable is either flush with or is located at a level above the surface 22 of the platform 13. The raised position of the turntable 34 is shown in FIG. 2 by phantom lines. The peripheral surface of the shaft 36 is provided with axially parallel alternating flutes and ribs 37 which mate with complementary ribs and flutes of a reversible electric motor 38 which is installed in or on the platform 13 and can rotate the turntable 34 back and forth (e.g., through angles of exactly 90°) or in a single direction. The flutes and ribs 37 and the complementary ribs and flutes of the output element of the motor 38 enable the turntable 34 and its shaft 36 to move up and down while compelling the shaft 36 (and hence the turntable) to share the angular movements of the output element of the motor 38. The shaft 36 has one or more substantially axially extending bores or holes (not specifically shown) which enable atmospheric air to flow from the ports 39 of the turntable 34 in the direction of arrow C and into the corresponding inlet of the suction generating device 40. Air which is drawn into the device 40 in the directions of arrows B and/or arrow C is discharged through an outlet of the device 40 in the direction of arrow D. The lower end of the shaft 36 can be slidably and sealingly telescoped into the corresponding inlet (arrow C) of the housing of the suction generating device 40.

Figure 4:
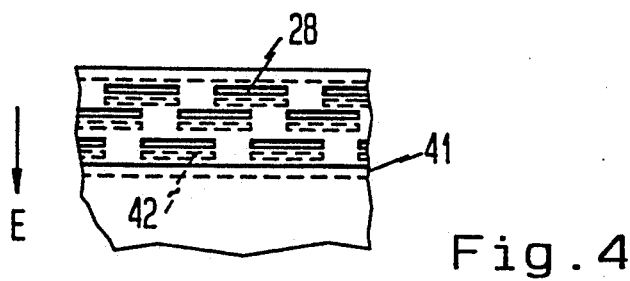
FIG. 4 is a plan view of a detail in the structure which is shown in FIGS. 2 and 3.

In order to properly manipulate a sheet 44a or 144a on the platform 13, the locating means including such platform further includes means for selectively connecting the ports 33 and/or 39 with the corresponding inlets of the suction generating device 40. The connecting means comprises suitable valves 41 (one shown in FIG. 4) which control the flow of air in the suction ducts 29 and 30. The valve 41 of FIG. 4 is a slide valve shiftable between a first position in which its slits 42 register with the adjacent slits 28 in the bottom surface of the respective groove 23 or 24 to thus permit air to enter the respective set of ports 33 and to flow into the corresponding inlet of the suction generating device 40, and a second position in which the slits 42 are not in register with the adjacent slits 28 so that the duct 29 or 30 is sealed and the ports 33 of the conveyor 25 or 26 cannot attract the adjacent portions of a sheet 44a or 144a. The direction in which the slide valve 41 of FIG. 4 must be shifted relative to the respective duct 29 or 30 in order to interrupt the flow of air from the conveyor 25 or 26 to the suction generating device 40 is indicated by an arrow E.

The means for selectively connecting the ports 39 of the turntable 34 with the corresponding inlet of the suction generating device 40 comprises a further valve 141 which is installed in the hollow shaft 36 or in the top inlet of the device 40 and can be turned between a first position and a second position. In the first position, the valve 141 permits air to flow from the suction ports 39 into the housing of the suction generating device 40. When the valve 141 is moved to the second position, the turntable 34 can no longer attract a sheet 44a or 144a which overlies the surface 22 of the platform 13.

The mode of operation of the apparatus of FIGS. 1 to 4 is as follows:

For example, the cassette 14 contains a web 44 which has a width of 13 cm and consists of a long series of coherent sheets 44a. If the customer desires prints having a size of 13×18 cm, the advancing rolls 43 are set in motion to draw a predetermined length (18 cm) of web 44 from the cassette 14 to a locus to the right of the severing plane defined by the stationary and mobile knives of the cutting device 20. The device 20 is then operated to sever a sheet 44a from the leader of the web 44; such sheet overlies the surface 22 of the platform 13 and is ready to receive the image of a film frame (e.g., the frame of a standard narrow photographic film) which is located at the copying station CS. The valves 41 in the ducts 29, 30 are then shifted to positions in which the suction ports 33 are free to attract the adjacent portions of the sheet 44a at the printing station PS. The motor 132 is started as soon as the sheet 44a is attracted to the upper reaches of the endless conveyors 25, 26, and these conveyors cooperate with suitable centering means (not shown) to ensure that the sheet 44a on the surface 22 assumes an optimum position for reception of an image which is projected by the varifocal lens 45 as soon as the centering operation is completed. The next step involves turning the valve 141 to its operative position so that the ports 39 also attract the sheet 44a and the latter is even more reliably held at the plane of the surface 22 while its emulsion-coated side is exposed to light passing through the film frame at the copying station CS. When the imaging of a film frame onto the sheet 44a at the station PS is completed, the valve 141 is shifted to the other position in order to seal the ports 39 from the suction generating device 40 but the ports 33 of the conveyors 25, 26 continue to attract the adjacent portions of the sheet 44a. The motor 132 is thereupon started so that the conveyors 25, 26 can advance the freshly exposed sheet 44a into the nip of the advancing rolls 62 which constitute the means for receiving sheets 44a or 144a from the locating means including the platform 13, and the advancing rolls 62 thereupon entrain the sheet 44a into the developing machine 3 wherein the sheet 44a is transported in a conventional manner to pass through the series of baths 16, through the dryer 17 and into the collating unit 18.

The heretofore described operation of the improved apparatus can be automated to any desired extent, e.g., by introducing data with a keyboard for storage in a suitable memory of a programming unit which thereupon starts and arrests various motors, energizes or deenergizes various electromagnets and/or otherwise initiates or terminates various movements and/or functions, operations or steps in an optimum sequence. The details of such automatic operating means form no part of the present invention.

If a customer desires to obtain a different format of prints, e.g., prints having a size of 9×13 cm, the cutting device 20 is operated to sever from the leader of the web 44 (this web is assumed to have a width of 13 cm) a relatively short sheet 44a which has a length of 9 cm. The front portion of the freshly severed sheet 44a (having a width of 13 cm and a length of 9 cm, as seen in the direction of advancement of the web 44 from the cassette 14 toward the platform 13) overlies the surface 22 and is in the range of the conveyors 25, 26. These conveyors are then set in motion by the motor 132 (while their ports 33 attract the adjacent portions of the sheet 44a) and cooperate with the aforementioned centering means to move the sheet to an optimum position for manipulation by the orientation changing means including the turntable 34 and the shaft 36 of the elevator for the turntable. The suction ports 39 are disconnected from the suction generating device 40 while the sheet 44a is being centered with assistance from the conveyors 25, 26. The next step involves moving the valves 41 to their sealing positions (so that the centered sheet 44a is no longer attracted by the ports 33 of the conveyors 25, 26) and moving the valve 141 to that position in which the ports 39 are free to attract the sheet on the platform 13 to the upper side of the turntable 34. The electromagnet 35 is then energized or deenergized so that the shaft 36 raises the turntable 34 to the phantom-line position of FIG. 2, and the motor 38 is thereupon started to turn the shaft 36 and the turntable 34 through a selected angle (normally 90°) in a clockwise or in a counterclockwise direction. The electromagnet 35 is then deenergized or energized so that the shaft 36 can lower the turntable 34 to the solid-line position of FIG. 2 in which the upper side of the turntable is flush with the surface 22 of the platform 13. The valves 41 are then actuated to connect the suction ports 33 of the conveyors 25, 26 to the respective inlets of the suction generating device 40, and the copying unit 2 is ready to image the film frame on the platform 12 onto the sheet 44a on the platform 13. The lens 45 is moved in the direction of its optical axis so that it can properly image the film frame at the station CS onto the relatively small (9×13 cm) sheet 44a at the station PS.

When the imaging step is completed, the suction ports 39 of the turntable 34 are sealed from the inlet of the suction generating device 40 and the motor 132 is started to transport the freshly exposed sheet 44a into the nip of the advancing rolls 62 preparatory to transport of such sheet through the developing machine 3 and into the collating unit 18.

It will be noted that, when the imaging step is completed, the relatively small sheet 44a can be transported into the range of the advancing rolls 62 without any further change of orientation, i.e., the sheet need not be lifted above the surface 22 and thereupon rotated by the turntable 34 prior to being advanced by the conveyors 25, 26, thereupon by the advancing rolls 62 and thereafter by the advancing mechanism in the developing machine 3. Such mode of manipulating relatively small sheets is preferred at this time because it saves much time which is particularly important in the aforediscussed establishments specializing in one-hour service.

If a customer desires to obtain prints of a size which cannot be arrived at by using the web 44, the person in charge causes the supplying rolls 143 to draw a selected length of web 144 from the cassette 15, and the cutting device 21 is thereupon caused to sever the web 144 so as to form a sheet 144a having the desired dimensions. Such sheet can receive the image of a film frame without a change of orientation by the turntable 34 or subsequent to turning through an angle of 90°. Thus, by using two cassettes (14, 15), the apparatus of FIG. 1 can furnish at least four differently dimensioned prints to thus satisfy the requirements of customers without unduly prolonging the intervals of time which are required to develop a film 10, to image the frames of the freshly developed film onto sheets (44a or 144a) of desired size, and to develop and collate the sheets so as to offer the customer a set of prints having the desired format. The utilization of a reversible motor 132 for the common pulley 32 of the conveyors 25, 26 enables these conveyors to transport and center a sheet 44a which was supplied by the advancing rolls 43 or a sheet 144a which was supplied by the advancing rolls 143.

The turntable 34 can be set in operation prior (as described above) or subsequent to imaging of a film frame onto the sheet 44a or 144a on the platform 13. For example, if the developing unit 3 is capable of simultaneously developing several freshly exposed sheets 44a or 144a, the turntable 34 can be operated prior or subsequent to imaging of sheets on the platform 13 if this contributes to more economical and more efficient utilization of the developing machine 3.

An important advantage of the improved apparatus is that it need not be equipped with numerous sources of differently dimensioned webs of coherent sheets. Thus, and as described hereinabove, two cassettes 14 and 15 suffice to provide supplies of at least four different formats of prints. This contributes to simplicity and lower cost as well as to compactness of the improved apparatus. All that is necessary is to provide orientation changing means which can properly orient a sheet 44a or 144a at the printing station PS prior or subsequent to transfer of an image from a film frame at the copying station CS.

It is equally within the purview of the invention to utilize the platform 13 at the printing station as a means for changing the orientation of a sheet 44a or 144a. The illustrated design (wherein the turntable 34 is carried by and can change its angular position relative to the platform 13) is preferred at this time, especially if the improved apparatus is utilized by the aforediscussed establishments which specialize in one-hour service, because the space requirements of a platform which is turnable in its entirety greatly exceed the space requirements of a relatively small turntable which is mounted in or at the platform and can be turned with minimal expenditures in energy. This holds true for rotation of the turntable 34 with a sheet 44a or 144a as well as for subsequent rotation (if necessary) of the turntable back to its starting position before the platform 13 receives a fresh sheet 44a or 144a.

The suction ports 39 constitute an optional but desirable and advantageous feature of the orientation changing means. Such suction ports ensure that a sheet portion which overlies the turntable 34 invariably shares the vertical as well as the angular movements of the turntable relative to the platform 13. This contributes to reliability and predictability of the sheet manipulating operation. The same holds true for the suction ports 33 of the conveyors 25 and 26. All of the suction ports 33 and 39 are preferably in communication with the respective inlets of the suction generating device 40 while the copying unit 2 is in the process of imaging a film frame onto a sheet 44a or 144a because such sheet is reliably held at an optimum level, namely at the plane of the surface 22 at the top of the platform 13. Such suction ports are used in lieu of bulkier mechanical holding or attracting means which would be required if the suction ports were omitted.

It is also within the purview of the invention to design the apparatus in such a way that the suction ports 33 and 39 are uninterruptedly connected with the corresponding inlets of the suction generating device 40, at least after a sheet 44a or 144a has been properly centered on the surface 22. Such mode of operation renders it necessary to increase the upward and downward strokes of the shaft 36 of FIG. 2 in order to ensure that the turntable 34 can lift a sheet sufficiently above the surface 22 so that the suction ports 33 of the conveyors 25, 26 cannot interfere with the change of orientation of the centered sheet 44a or 144a. In other words, it is then necessary to lift a sheet to a level such that the suction ports 33 no longer attract the lifted sheet or that their attracting force does not suffice to prevent the lifted sheet from sharing the angular movements of the turntable 34. The aforedescribed mode of operation (which involves sealing, at times, the suction ports 33 and/or 39 from the respective inlets of the suction generating device 40) is preferred at this time because the sheets 44a or 144a on the turntable 13 can be manipulated with an even higher degree of reliability and predictability. Thus, the ports 39 are inactive while a sheet is being attracted by the ports 33 and is being centered with assistance from the conveyors 25, 26, the ports 33 are inactive and the ports 39 are active during lifting and turning of a sheet at a level above the surface 22, the ports 33 remain inactive during lowering of a freshly exposed sheet, and the ports 39 are inactive while the conveyors 25, 26 advance a sheet into the range of the receiving means including the advancing rolls 62.

The varifocus lens 45 can be replaced with a set of two or more discrete objective lenses. It is then necessary to install in the unit 2 a different lens whenever the format of prints is to be changed. Therefore, it is presently preferred to employ a varifocus lens.

A varifocus lens which can be used in the apparatus of the present invention is disclosed, for example, in commonly owned copending patent application Ser. No. 07/922,052 filed Jul. 29, 1992.

Figure 5:
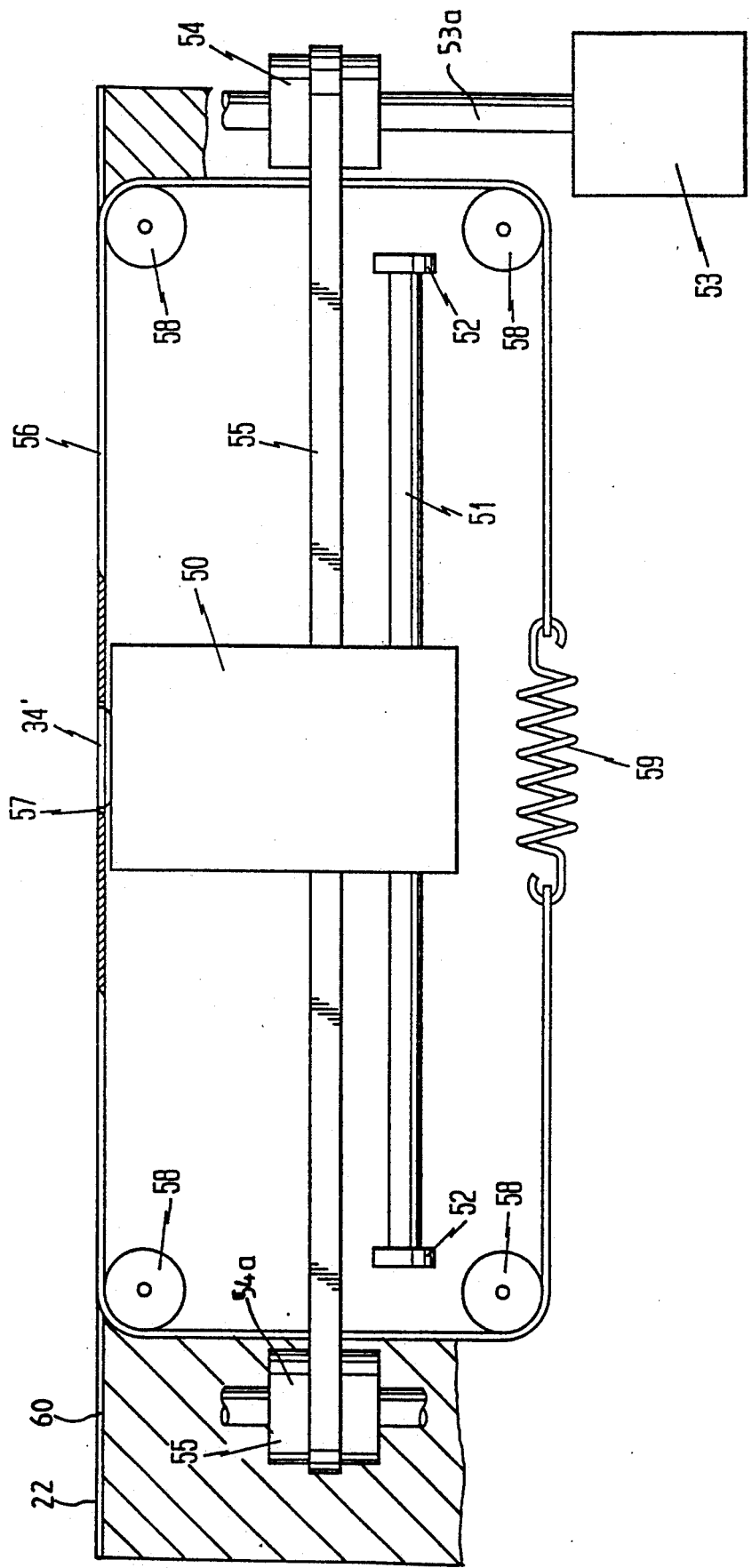
FIG. 5 is a schematic partly elevational and partly vertical sectional view of a portion of a second apparatus.

FIG. 5 shows a portion of a second apparatus which differs from the apparatus of FIGS. 1-4 primarily in that the turntable 34' is not only rotatable relative to but is also reciprocable along the top surface 22 of the platform 13. The motor 38 or an analogous motor (not shown) is installed in a carriage 50 which mounts the turntable 34' and forms part of means for moving the turntable relative to the platform 13 between a plurality of different positions. The moving means further comprises a reversible electric or other suitable motor 53, a driver pulley or sprocket wheel 54 which is mounted on the output element 53a of the motor 53, a driven pulley or sprocket wheel 54a, and a belt or chain 55 which is trained over the parts 54, 54a and is secured to the carriage 50. The latter is reciprocable along one or more tie rods 51 or other suitable guide means provided with stops 52 serving to determine certain or all selected positions of the turntable 34' relative to the platform 13.

The surface 22 of the platform 13 is provided with an elongated straight recess or groove 60 which can accommodate the turntable 34' in such a way that the upper side of the turntable is flush with the surface 22. That portion of the recess 60 which is not occupied by the turntable 34' is filled by a portion of a cover here shown as an elongated band conveyor 56 having a cutout 57 for the turntable 34'. The upper side of the band conveyor 56 is flush with the surface 22 and with the upper side of the turntable 34'. The band conveyor 56 is compelled to share the movements of the turntable 34' along the recess 60 and vice versa. The band conveyor 56 is trained over pulleys 58 which are mounted in or on the platform 13, and the two free ends of the band conveyor are coupled to each other by one or more coil springs 59 or other suitable resilient coupling elements. The spring or springs 59 are optional, i.e., the conveyor 56 can constitute an endless band; however, it is simpler to mount this conveyor on the pulleys 58 if it carries one or more coil springs or analogous resilient coupling elements because the spring or springs 59 are simply stretched during mounting of the conveyor on or during removal of the conveyor from the pulleys 58. The spring or springs 59 can be disposed at the underside of the platform 13 when the band conveyor 56 is properly mounted on the pulleys 58.

The motor 53 can cause the belt or chain 55 to move the carriage 50 and the turntable 34' to a first position (e.g., against the left-hand stop 52 on the illustrated tie rod 51) in which the turntable 34' is located beneath a discrete sheet 44a (not shown in FIG. 5). The upper reach of the band conveyor 56 shares such movement of the turntable 34'. The suction generating device 40 (not shown in FIG. 5 but installed in the carriage 50) is then actuated so that the ports in the turntable 34' (and, if provided, in the upper reach of the band conveyor 56) attract the sheet 44a. The motor 53 is then caused to move the turntable 34' to a second position (e.g., a median position) in which the sheet 44a thereon is properly centered and is ready to receive the image of a film frame at the copying station CS (not shown in FIG. 5), either prior or subsequent to a change in angular position of the turntable or without any change of angular position of the turntable prior to or after the imaging step. The turntable 34' may but need not be mounted for upward and downward movement relative to the surface 22 of the platform 13, depending upon the magnitude of pneumatic attraction which is exerted by suction in the ports of the turntable 34'. Thus, if the turntable 34' can attract a sheet 44a with a rather pronounced force, the sheet can be reliably turned through an angle of normally 90° (or any other required angle) as long as the suction in the ports (if any) of the band conveyor 56 is reduced or interrupted. However, it is preferred to hold a sheet 44a by suction or otherwise (so that the sheet overlies and abuts the surface 22 of the platform 13 and the upper sides of 20 the band conveyor 56 and turntable 34') during imaging of a film frame onto such sheet.

If the band conveyor 56 is not provided with suction ports, such ports can be provided in the surface 22 of the platform 13 adjacent the recess 60 for the turntable 34' and the upper reach of the conveyor 56. The suction ports in the surface 22 are then caused to attract a sheet 44a in the course of the actual imaging operation. Of course, suction ports in the surface 22 can be provided in addition to or in lieu of suction ports in the band conveyor 56.

An advantage of the apparatus which embodies the structure of FIG. 5 is that the conveyors 25, 26 can be omitted, i.e., the apparatus of FIG. 5 is simpler. The function of the conveyors 25, 26 is performed by the reciprocable turntable 34', with or without assistance from the band conveyor 56 whose primary function can be said to be to fill that portion of the recess 60 which is not occupied by the turntable.

The motor 53 can move the carriage 50 and the turntable 34' to a further position (e.g., against the right-hand stop 52 of FIG. 5) in which the exposed sheet 44a can be accepted by the receiving means 62 to be advanced into the first bath of the developing machine 3. With reference to FIG. 1, the motor 53 can move the turntable 34' to a position in which the turntable is located beneath the leader of the web 44 (or beneath the freshly separated sheet 44a which has been severed from the web 44) or to a position in which the turntable 34' is located beneath the leader of the web 144 or beneath a freshly severed sheet 144a to the left of the cutting means 21, and a position for imaging. If the cassette 15 is removed or omitted, the turntable 34' is movable between the aforediscussed three different positions including a first position beneath a sheet 44a at the cutting means 20, a second position ready for transfer of an image onto the sheet 44a which is attracted by the turntable 34', and a third position in which the sheet 44a can be accepted by the receiving means 62.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. Apparatus for making copies of photographic films on discrete sheets of photosensitive material, comprising means for positioning films at a copying station; means for locating discrete sheets at a printing station, said locating means defining a predetermined plane for a sheet at said printing station; means for imaging a film at said copying station onto a sheet at said printing station; and means for changing the orientation of a sheet at said printing station, said orientation changing means including means for turning a sheet at said printing station at said plane in or at least close to said plane.

2. The apparatus of claim 1, wherein said turning means includes means for attracting a sheet at said plane.

3. The apparatus of claim 2, wherein said attracting means includes suction ports in said turning means.

4. The apparatus of claim 1, wherein said turning means comprises a turntable.

5. The apparatus of claim 1, wherein said locating means comprises at least one conveyor for sheets.

6. The apparatus of claim 1, wherein said locating means comprises two conveyors for sheets and said turning means is disposed between said conveyors.

7. The apparatus of claim 6, wherein at least one of said conveyors has means for attracting sheets.

8. The apparatus of claim 7, wherein said attracting means includes suction ports in said at least one conveyor.

9. The apparatus of claim 8, wherein said turning means has ports for attracting a sheet by suction, said locating means further comprising at least one suction generating device and means for selectively connecting said at least one suction generating device with said ports.

10. The apparatus of claim 9, wherein said connecting means includes means for connecting said at least one suction generating device only with the ports of said at least one conveyor, only with the ports of said turning means or with all of said ports.

11. The apparatus of claim 1, wherein said orientation changing means further comprises an elevator having means for raising said turning means and a sheet thereon above said plane prior to turning and for lowering said turning means and a sheet thereon toward said plane subsequent to turning.

12. The apparatus of claim 1, further comprising at least one source of a web of coherent sheets and means for subdividing the web into discrete sheets.

13. The apparatus of claim 1, wherein said imaging means includes a varifocal lens.

14. Apparatus for making copies of photographic films on discrete sheets of photosensitive material, comprising means for positioning films at a copying station; means for locating discrete sheets at a printing station; means for imaging a film at said copying station onto a sheet at said printing station; means for changing the orientation of a sheet at said printing station; a plurality of sources each containing a web of coherent sheets; and discrete web cutting means for each of said sources.

15. The apparatus of claim 14, wherein said locating means defines a predetermined plane for a sheet at said printing station, said orientation changing means including means for changing the orientation of a sheet at said printing station at said plane.

16. The apparatus of claim 14, wherein said sources include a first and a second source, said locating means being disposed between said first and second sources.

17. Apparatus for making copies of photographic films on discrete sheets of photosensitive material, comprising means for positioning films at a copying station; means for locating discrete sheets at a printing station; means for imaging a film at said copying station onto a sheet at said printing station; means for changing the orientation of a sheet at said printing station, said orientation changing means including means for turning a discrete sheet; means for supplying discrete sheets to said turning means; and means for transporting said turning means between a first position for reception of a sheet from said supplying means and a second position at said printing station.

18. The apparatus of claim 17, wherein said transporting means comprises means for moving said turning means to a third position and further comprising means for receiving sheets from said turning means in said third position.

19. The apparatus of claim 17, wherein said locating means includes a platform disposed at said printing station and having a recess for said turning means, said turning means occupying a portion of and being movable in said recess between said positions thereof, said locating means further comprising a cover for the non-occupied portion of said recess.

20. The apparatus of claim 19, wherein said cover includes a band which is connected to and is movable with said turning means relative to said platform.

21. The apparatus of claim 20, wherein said turning means and said band have coplanar sheet supporting surfaces.

22. The apparatus of claim 20, wherein said band has two free ends and said cover further comprises at least one resilient coupling element connected with said free ends.

* * * * *